(12) United States Patent
Scheibenzuber et al.

(10) Patent No.: US 10,384,496 B1
(45) Date of Patent: Aug. 20, 2019

(54) CONFIGURATION DATA STORAGE FOR A TIRE PRESSURE SENSOR

(71) Applicant: Infineon Technologies AG, Neubiberg (DE)

(72) Inventors: Wolfgang Scheibenzuber, Munich (DE); Ismael Fernando Gamboa Corro, Munich (DE); Michael Kandler, Sauerlach (DE); Maximilian Werner, Fischach (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/896,806

(22) Filed: Feb. 14, 2018

(51) Int. Cl.
  *B60C 23/04* (2006.01)
  *H04B 1/38* (2015.01)
  *H04W 4/80* (2018.01)

(52) U.S. Cl.
  CPC ...... *B60C 23/0471* (2013.01); *B60C 23/0442* (2013.01)

(58) Field of Classification Search
  CPC ...... B60C 23/00; B60C 23/04; B60C 23/0408
  See application file for complete search history.

(56) References Cited

U.S. PATENT DOCUMENTS

| 2006/0290485 | A1* | 12/2006 | Watabe | B60C 23/0408 340/447 |
| 2007/0090935 | A1* | 4/2007 | Miller | B60C 23/0408 340/445 |
| 2007/0135179 | A1* | 6/2007 | Hardman | B60C 23/0433 455/574 |
| 2009/0102636 | A1* | 4/2009 | Tranchina | B60C 23/0408 340/447 |
| 2013/0106596 | A1* | 5/2013 | Mouchet | B60C 23/02 340/445 |
| 2014/0002258 | A1* | 1/2014 | Chen | B60C 23/0455 340/447 |
| 2014/0253311 | A1* | 9/2014 | Yu | B60C 23/00 340/447 |
| 2016/0039365 | A1* | 2/2016 | Vanderwall | B60R 25/24 701/36 |
| 2017/0028796 | A1* | 2/2017 | Patel | B60C 23/0408 |
| 2018/0111429 | A1* | 4/2018 | Matsuoka | H04B 17/318 |
| 2018/0154708 | A1* | 6/2018 | Yang | G01M 17/02 |
| 2018/0361801 | A1* | 12/2018 | Okumura | B60C 23/0408 |
| 2019/0059050 | A1* | 2/2019 | Fuleshwar Prasad | H04W 4/70 |
| 2019/0059053 | A1* | 2/2019 | Qaderi | H04W 52/0216 |

FOREIGN PATENT DOCUMENTS

CN  102963219 A  * 3/2013  ............. B60C 23/02

* cited by examiner

*Primary Examiner* — Blane J Jackson

(74) *Attorney, Agent, or Firm* — Schiff Hardin LLP

(57) ABSTRACT

A tire pressure sensor of a vehicle having a receiver configured to receive, from an Electronic Control Unit (ECU) mounted in the vehicle and having configuration data stored therein, an acknowledgement signal including a request for configuration, and the configuration data; and a controller configured to update the tire pressure sensor with the received configuration data.

17 Claims, 3 Drawing Sheets

CONFIGURATION DATA STORAGE FOR A TIRE PRESSURE SENSOR

BACKGROUND

A tire pressure sensor in a Tire Pressure Monitoring System (TPMS) is a coin-cell battery-powered device mounted inside a tire of a vehicle. The tire pressure sensor has a transmitter that periodically transmits tire information to a vehicle-mounted Electronic Control Unit (ECU). The tire pressure sensor also has a receiver, which after the sensor is mounted in a vehicle tire during production, sensor replacement, and/or firmware update, receives from the ECU configuration information.

Conventional tire pressure sensors transmit tire information to the ECU via a Radio Frequency (RF) transmitter at 315 or 434 MHz over a unidirectional wireless channel, but receive information via an energy-efficient Low Frequency (LF) receiver at 125 kHz over a second unidirectional wireless channel. To reduce cost, these two unidirectional wireless channels might be replaced by a single bidirectional wireless channel, such as a Bluetooth Low Energy (BLE) channel.

A problem with the bidirectional wireless channel is the receiving operation consumes too much energy for the tire presser sensor receiver to be powered on continuously. Thus, the receiver is powered on only for short intervals, making immediate communication from the ECU to the tire pressure sensor directly no longer possible. Instead, an operator's hand-held external configuration controller waits for the tire pressure sensor receiver to power up, which could take several minutes, before transmitting configuration information. In a worst-case scenario, the external configuration controller must wait for the entire receiver off time until the tire pressure sensor reacts to a configuration request. If four tires must be configured, then all of these wait times add up to a significant, unacceptable delay.

Tire pressure sensors using BLE wireless channels without a LF receiver exist. However, these tire pressure sensors are retrofit to have a dedicated, high cost receiver, or alternatively, the transceiver transmits directly to a user's smartphone with no integration of the tire information into the vehicle's dashboard. These limitations are due to tire pressure sensors lacking an energy-efficient configuration mechanism, as described herein.

DESCRIPTION OF THE ASPECTS

This disclosure is directed to a Tire Pressure Monitoring System (TPMS) that stores tire pressure sensor configuration data in a vehicle's Electronic Control Unit (ECU), and subsequently transmits the configuration data from the ECU to a tire pressure sensor at a subsequent time when the tire pressure sensor's receiver is powered up.

Figure 1:
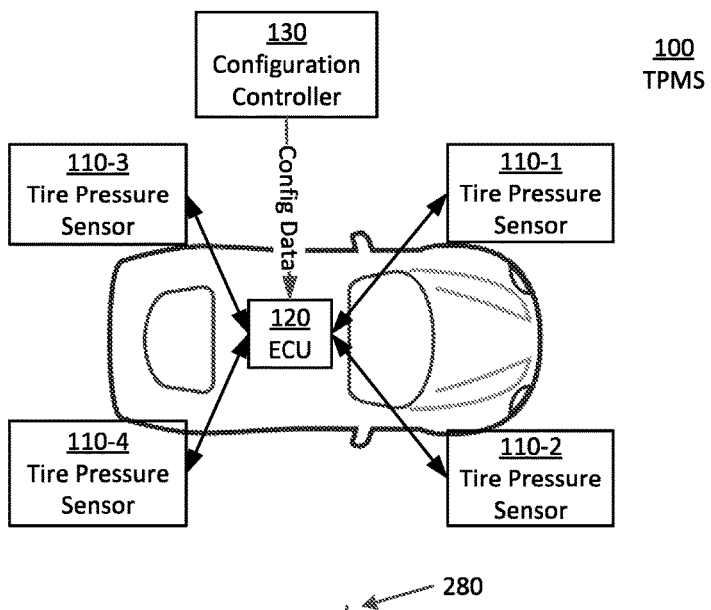
FIG. 1 illustrates a Tire Pressure Monitoring System (TPMS) in accordance with the disclosure.

FIG. 1 illustrates a Tire Pressure Monitoring System (TPMS) 100 in accordance with the disclosure.

The TPMS 100 comprises one or more tire pressure sensors 110, an Electronic Control Unit (ECU) 120, and an external configuration controller 130. The tire pressure sensors 110 (110-1, 110-2, 110-3, and/or 110-4) are located in respective tires of a vehicle. The ECU 120 is located within the vehicle body.

The external configuration controller 130 is not located within the vehicle and communicates configuration data to the ECU 120 via a wired or wireless bidirectional communication channel. The wired communication channel may comprise a cable connection, or other appropriate connection as suitable. The wireless communication channel may be based on any wireless protocol, such as a Bluetooth, WiFi, cellular, etc. The configuration controller 130 may be located relatively close to the ECU 120, or alternatively, at a distance. Since many vehicles have an internet connection, the configuration controller 130 may optionally be configured to communicate the configuration data to the ECU 120 at least partially via the Internet.

The external configuration controller 130 transmits configuration data, not to the tire pressure sensors 110 directly, but instead to the ECU 120 for storage therein. The ECU 120 subsequently transmits the stored configuration data to the tire pressure sensors 110. This method is much faster than the conventional methods because the ECU 120 is connected to the vehicle's battery and thus can remain powered on continuously to listen for incoming configuration information. In this way, configuration data for a tire pressure sensor 110 may be transmitted by the configuration controller 130 to the ECU 120 without delay. Also, the ECU 120 needs to be programmed with the configuration data only once to configure all of the tire pressure sensors 110-1, 110-2, 110-3, and 110-4.

The ECU 120 is configured to wait for the receiver of a tire pressure sensor to power up, and then the ECU 120 transmits any configuration data stored therein to the individual tire pressure sensors 110. This transmission is handled by the ECU 120 without further control from the external control unit 130, and thus may be performed in parallel to further production steps, thereby further reducing delay.

Figure 2:
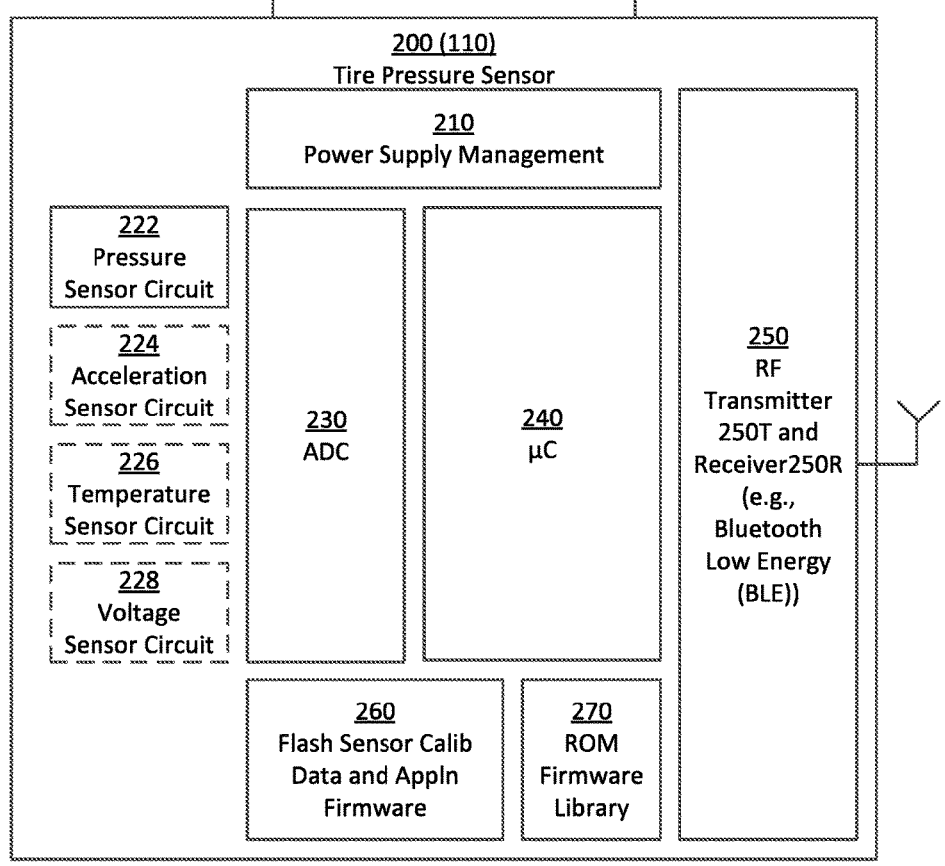
FIG. 2 illustrates a tire pressure sensor of the TPMS of FIG. 1.

FIG. 2 illustrates a tire pressure sensor 200 in the TPMS 100 of FIG. 1. This tire pressure sensor 200 is merely an example, and thus some of its details are not meant to be limiting.

The tire pressure sensor 200 comprises power supply management 210, a plurality of sensor circuits, an Analog-to-Digital Converter (ADC) 230, a microcontroller 240, a transmitter 250T and receiver 250R (in combination referred to as a transceiver 250), flash sensor calibration data and application firmware 260, a Read Only Memory (ROM) firmware library 270, and a battery 280.

The plurality of sensor circuits may comprise a pressure sensor circuit 222, an optional acceleration sensor circuit 224, an optional temperature sensor circuit 226, and an optional voltage sensor circuit. The receiver 250R may be, for example, a Bluetooth Low Energy (BLE) receiver, though the disclosure is not limited in this respect. The transceiver 250 may be based on any protocol having a bidirectional communication channel. The battery 280 is configured to power the tire pressure sensor 200 through the power supply management 210.

Figure 3A:
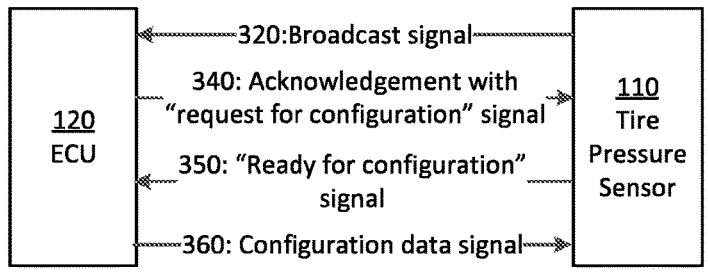
FIGS. 3A and 3B illustrate a method for updating configuration data in a tire pressure sensor of the TPMS of FIG. 1 in accordance with an aspect of the disclosure.
Figure 3B:
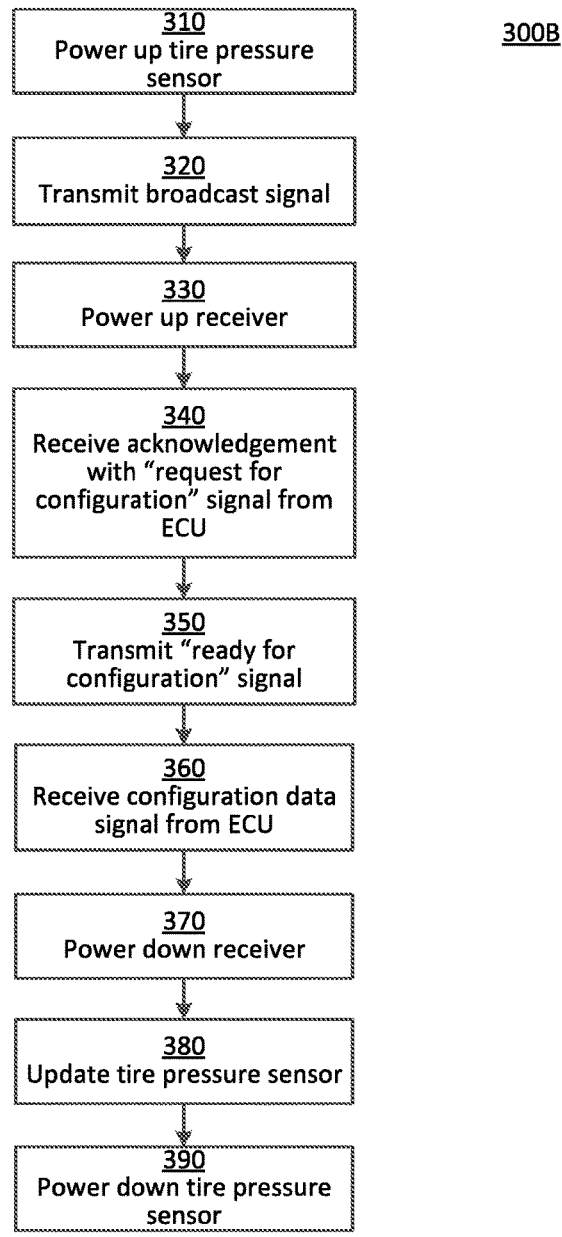

FIGS. 3A and 3B illustrate a method 300 for updating configuration data in a tire pressure sensor 110 in the TPMS 100 of a vehicle of FIG. 1 in accordance with an aspect of the disclosure. FIG. 3A illustrates communication between the tire pressure sensor 110 and the ECU 120, and FIG. 3B illustrates a flowchart 300B of a corresponding method from the tire pressure sensor perspective.

By way of overview, when the tire pressure sensor 110 powers up for a regular broadcast to send information, such as pressure sensor data, the ECU 120 transmits an acknowledgement with a "request for a configuration" (reflashing) signal.

More specifically, at 310, the microcontroller 240 powers up the tire pressure sensor 110/200.

At 320, the microcontroller 240 periodically transmits, via the transmitter 250T, a broadcast signal. The broadcast signal may comprise the tire pressure sensor's identification, tire pressure data, and any other information as desired.

At 330, the microcontroller 240 powers up the tire pressure sensor's receiver 250R to be ready to receive signals from the ECU 120. It should be understood that 320 and 330 could be performed simultaneously or in reverse order.

At 340, the receiver 250R receives from the ECU 120 an acknowledgement signal in response to the ECU 120 having received the broadcast signal. If the ECU 120 has new configuration data stored therein, the receiver 250R receives with the acknowledgement signal a "request for configuration" signal.

At 350, in response, the microcontroller 240, via the transmitter 250T of the tire pressure sensor 110/200, transmits to the ECU 120 a "ready for configuration" signal.

At 360, the receiver 250R of the tire pressure sensor 110/200 receives from the ECU 120 the configuration data. The transmitter 250T may also transmit to the ECU 120 a confirmation signal. Once the ECU 120 has received confirmation signals from all the tire pressure sensors 110 to be reconfigured, the configuration routine is finished.

At 370, the microcontroller 240 powers down the receiver 250 to save power.

At 380, the microcontroller 240 updates the tire pressure sensor 120/200 with the received configuration data. It should be understood that 370 and 380 could be performed simultaneously or in reverse order.

At 390, the microcontroller 240 may power down the tire pressure sensor 110/200.

Figure 4A:
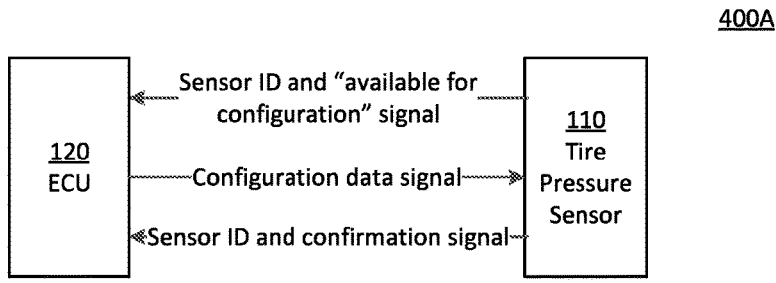
FIGS. 4A and 4B illustrate a process for updating configuration data in a tire pressure sensor of the TPMS of FIG. 1 in accordance with another aspect of the disclosure.
Figure 4B:
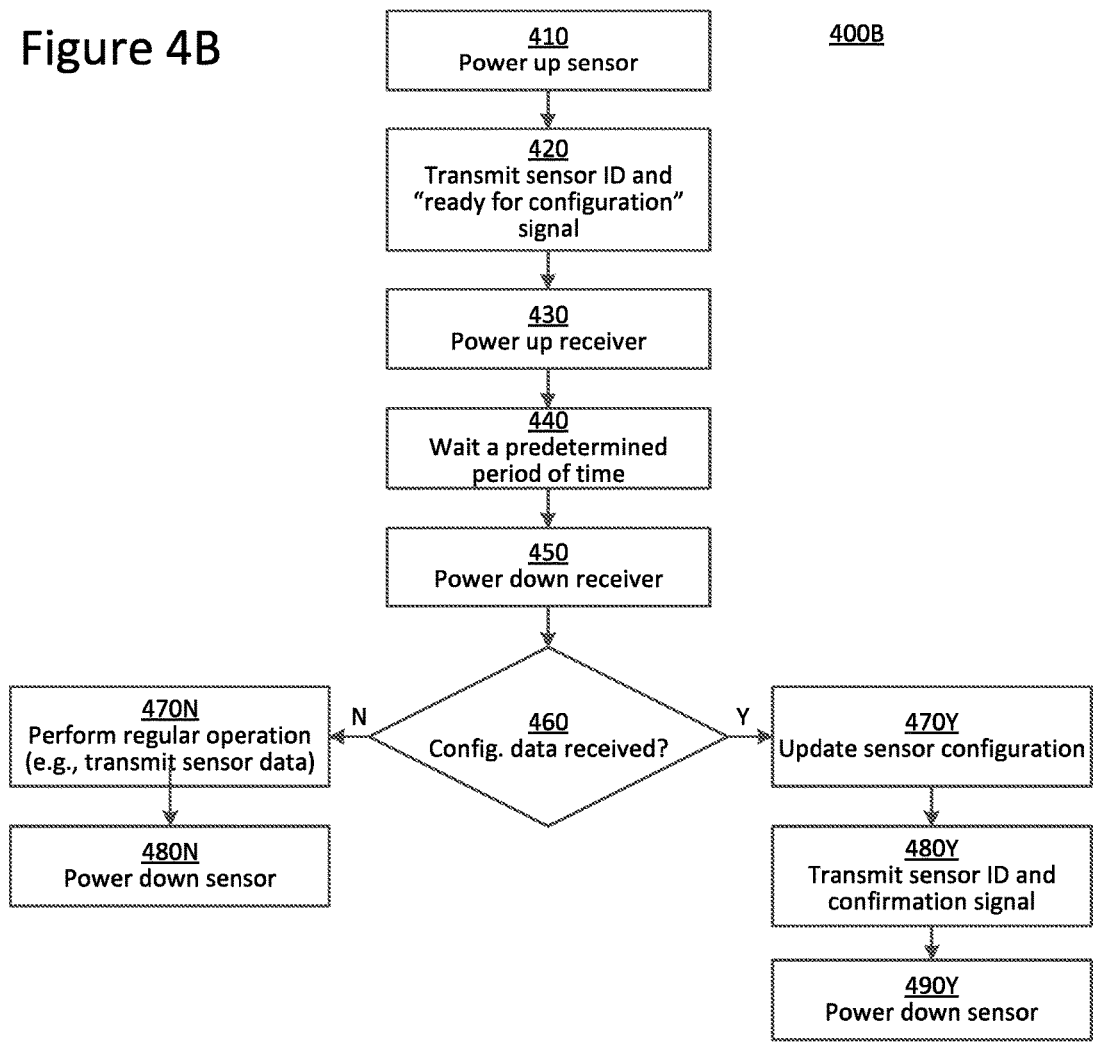

FIGS. 4A and 4B illustrate a method 400 for updating configuration data in a tire pressure sensor 110 in the TPMS 100 of FIG. 1 in accordance with another aspect of the disclosure. FIG. 4A illustrates communication between the tire pressure sensor 110 and the ECU 120, and FIG. 4B illustrates a flowchart 400B of the corresponding method from the tire pressure sensor's perspective.

By way of overview, the tire pressure sensor 110 periodically powers up and transmits a sensor identification and "ready for configuration" signal, which indicates to the ECU 120 that the tire pressure sensor 110 is available for configuration.

More specifically, at 410, the microcontroller 240 powers up the tire pressure sensor 110/200.

At 420, the transmitter 250T of the tire pressure sensor 110/200 transmits to the ECU 120 mounted in the vehicle body, a tire pressure sensor identification and a "ready for configuration" signal on a periodic basis. From the ECU 120 perspective, when the ECU 120 receives configuration data from the external configuration controller 130, the ECU 120 starts to listen for the tire pressure sensor's "ready for configuration" signal.

At 430, the microcontroller 250 powers up the receiver 250R of the tire pressure sensor 110/200 for a short, predetermined period of time interval to check if the ECU 120 sends configuration data. It is understood that 420 and 430 may be performed simultaneously or in reverse order.

At 440, the tire pressure sensor 110 waits for a predetermined period of time.

At 450, after the predetermined period of time has lapsed, the microcontroller 240 powers down the receiver 250R.

At 460, the microcontroller 250 determines whether the tire pressure sensor 110/200 received from the ECU 120, within the predetermined period of time, configuration data that was stored within the ECU 120.

At 470Y, if the tire pressure sensor 110/200 successfully receives the configuration data, the microcontroller 240 updates the tire pressure sensor 110/200 with the received configuration data.

At 480Y, the microcontroller 240 transmits, via the transmitter 250T, a sensor identification and confirmation signal. Once the ECU 120 has received confirmation signals from all the tire pressure sensors 110 to be reconfigured, the configuration routine is finished.

At 490Y, the microcontroller 240 powers down the tire pressure sensor 110/200.

At 470N, if the tire pressure sensor 110/200 does not receive configuration data with the predetermined period of time, the tire pressure sensor 110/200 performs a regular operation, such as transmitting to the ECU 120 pressure data.

At 480N, the microcontroller 240 powers down the tire pressure sensor 110/200.

The method described with respect to FIGS. 3A and 3B above has advantages over that of FIGS. 4A and 4B. Rather than the tire pressure sensor 110 transmitting a "ready for configuration" signal, the tire pressure sensor 110 powers up for a regular communication with the ECU 120, and if the ECU 120 has configuration data stored therein, the ECU 120 responds to the tire pressure sensor 110 with an acknowledgement signal including the configuration data. There is no additional powering up of the tire pressure sensor.

While the foregoing has been described in conjunction with exemplary aspects of FIGS. 3 and 4, it is understood that these are merely meant as an examples. The disclosure is intended to cover alternatives, modifications and equivalents, which may be included within the scope of the disclosure. Also, while the disclosure describes the TPMS 100 as comprising an ECU in particular, this is not meant to be limiting. The ECU may be replaced by an alternative controller configured to perform similar functions.

The invention claimed is:

1. A tire pressure sensor of a vehicle, comprising:
   a receiver configured to receive, from an Electronic Control Unit (ECU) mounted in the vehicle and having configuration data stored therein, an acknowledgement signal including a request for configuration, and the configuration data; and
   a controller configured to power up and power down the receiver, and to update the tire pressure sensor with the received configuration data.

2. The tire pressure sensor of claim 1, wherein:
   the controller is configured to power up the receiver for a periodic transmission of pressure data by a transmitter of the tire pressure sensor to the ECU, and
   the ECU, in response to receiving the periodic sensor data, transmits to the receiver an acknowledgement signal including a request for configuration if the ECU has new configuration data stored therein.

3. The tire pressure sensor of claim 1, wherein the tire pressure sensor is configured to communicate with the ECU via a bidirectional communication link.

4. The tire pressure sensor of claim 1, wherein the receiver is a Bluetooth Low Energy (BLE) receiver.

5. A tire pressure sensor of a vehicle, comprising:
a receiver;
a transmitter configured to transmit to an Electronic Control Unit (ECU) mounted in the vehicle, a tire pressure sensor identification and a ready for configuration signal; and
a controller configured to:
power up the receiver;
determine whether the receiver receives from the ECU, within a predetermined period of time, configuration data stored within the ECU; and
if the tire pressure sensor receives the configuration data, update the tire pressure sensor with the received configuration data.

6. The tire pressure sensor of claim 5, wherein after the receiver receives the configuration data, the controller is further configured to power down the receiver.

7. The tire pressure sensor of claim 5, wherein if the receiver does not receive the stored configuration data, the transmitter is configured to transmit to the ECU pressure data.

8. The tire pressure sensor of claim 5, wherein the controller is configured to power up the receiver and transmit to the ECU the tire pressure sensor identification and the ready for configuration signal on a periodic basis.

9. A method for updating configuration data in a tire pressure sensor of a vehicle, comprising:
receiving, from the Electronic Control Unit (ECU) by a receiver of the tire pressure sensor, an acknowledgement signal including a request for configuration; and
transmitting, by a transmitter of the tire pressure sensor to the ECU, a ready for configuration signal,
receiving, by the receiver of the tire pressure sensor, from the ECU mounted in the vehicle and having configuration data stored therein, the configuration data; and
updating, by a controller of the tire pressure sensor, tire pressure sensor with the received configuration data.

10. The method of claim 9, further comprising:
powering up the receiver prior to the receiver receiving from the ECU the acknowledgement signal including the request for configuration; and
powering down the receiver after the receiver receives from the ECU the configuration data.

11. The method of claim 9, further comprising:
powering up the receiver for a periodic transmission of pressure data by a transmitter of the tire pressure sensor to the ECU; and
in response to receiving the periodic sensor data, transmitting by the ECU to the receiver an acknowledgement signal including a request for configuration if the ECU has new configuration data stored therein.

12. A Tire Pressure Monitoring System (TPMS), comprising:
an Electronic Control Unit (ECU) mounted in a vehicle and having configuration data stored therein; and
a tire pressure sensor, comprising:
a receiver configured to receive, from the ECU, and acknowledgement signal including a request for configuration, and the configuration data; and
a controller configured to power up and power down the receiver, and to update the tire pressure sensor with the received configuration data.

13. The TPMS of claim 12, further comprising a plurality of the tire pressure sensors.

14. The TPMS of claim 12, wherein the ECU is configured to receive the configuration data to be stored therein from an external configuration controller.

15. The TPMS of claim 12, wherein the ECU is configured to receive the configuration data to be stored therein from an external configuration controller via a wireless connection.

16. The TPMS of claim 12, wherein the ECU is configured to receive the configuration data to be stored therein from an external configuration controller via a cable connection.

17. The TPMS of claim 12, wherein the ECU is configured to receive the configuration data to be stored therein via the Internet.

* * * * *